United States Patent
Ibrahim et al.

(10) Patent No.: US 12,418,865 B2
(45) Date of Patent: Sep. 16, 2025

(54) CROSS-LINK INTERFERENCE DETERMINATION FOR AN UPLINK SHARED CHANNEL

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Wanshi Chen, San Diego, CA (US); Huilin Xu, Temecula, CA (US); Ahmed Attia Abotabl, San Diego, CA (US); Krishna Kiran Mukkavilli, San Diego, CA (US); Hwan Joon Kwon, San Diego, CA (US); Tingfang Ji, San Diego, CA (US); Yu Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 211 days.

(21) Appl. No.: 18/040,561

(22) PCT Filed: Sep. 21, 2020

(86) PCT No.: PCT/CN2020/116446
§ 371 (c)(1),
(2) Date: Feb. 3, 2023

(87) PCT Pub. No.: WO2022/056903
PCT Pub. Date: Mar. 24, 2022

(65) Prior Publication Data
US 2024/0259956 A1    Aug. 1, 2024

(51) Int. Cl.
H04W 52/24 (2009.01)
H04W 52/32 (2009.01)
H04W 52/36 (2009.01)

(52) U.S. Cl.
CPC ....... H04W 52/243 (2013.01); H04W 52/325 (2013.01); H04W 52/365 (2013.01)

(58) Field of Classification Search
CPC ............ H04W 52/243; H04W 52/325; H04W 52/365
See application file for complete search history.

(56) References Cited

U.S. PATENT DOCUMENTS

2017/0019238 A1* 1/2017 Sharma ................. H04L 5/1461
2019/0166607 A1* 5/2019 Zhou .................... H04L 1/1812
(Continued)

FOREIGN PATENT DOCUMENTS

| CN | 108243448 A | 7/2018 |
| CN | 109327847 A | 2/2019 |
| WO | WO-2020103609 A1 | 5/2020 |

OTHER PUBLICATIONS

International Search Report and Written Opinion—PCT/CN2020/116446—ISA/EPO—May 26, 2021.
(Continued)

*Primary Examiner* — Raymond S Dean
(74) *Attorney, Agent, or Firm* — Guang Y. Zhang; Harrity & Harrity, LLP

(57) ABSTRACT

Various aspects of the present disclosure generally relate to wireless communication. In some aspects, a base station may receive a sounding reference signal (SRS) from a first user equipment (UE). The base station may receive a cross-link interference (CLI) report from a second UE based at least in part on the SRS. The base station may determine a CLI from an uplink shared channel based at least in part on a power headroom report for the uplink shared channel
(Continued)

received from the first UE and the CLI report received from the second UE. Numerous other aspects are provided.

30 Claims, 12 Drawing Sheets

(56) References Cited

U.S. PATENT DOCUMENTS

| | | | | |
|---|---|---|---|---|
| 2020/0213052 | A1* | 7/2020 | Li | H04W 72/23 |
| 2021/0135833 | A1* | 5/2021 | Hao | H04L 5/0023 |
| 2021/0329473 | A1* | 10/2021 | Zhang | H04L 5/0048 |

OTHER PUBLICATIONS

Qualcomm Incorporated: "Interference Detection Schemes", 3GPP TSG RAN WG1 Meeting #90b, R1-1718159, Prague, Czechia, Oct. 9-13, 2017, 3 Pages, Section 2.

* cited by examiner

CROSS-LINK INTERFERENCE DETERMINATION FOR AN UPLINK SHARED CHANNEL

CROSS-REFERENCE TO RELATED APPLICATION

This patent application is a 371 national stage of PCT Application No. PCT/CN2020/116446, filed on Sep. 21, 2020, entitled "CROSS-LINK INTERFERENCE DETERMINATION FOR UPLINK SHARED CHANNEL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for cross-link interference determination for an uplink shared channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station includes receiving a sounding reference signal (SRS) from a first user equipment (UE); receiving a cross-link interference (CLI) report from a second UE based at least in part on the SRS; and determining a CLI from an uplink shared channel based at least in part on a power headroom report for the uplink shared channel received from the first UE and the CLI report received from the second UE.

In some aspects, a method of wireless communication performed by a UE includes receiving an SRS configuration from a base station; transmitting an SRS at a predefined power based at least in part on the SRS configuration; and transmitting, to the base station, a power headroom report for an uplink shared channel, wherein a CLI from the uplink shared channel is to be determined by the base station based at least in part on the power headroom report and a CLI report from a second UE based at least in part on the SRS transmitted by the first UE.

In some aspects, a base station for wireless communication includes a memory; and one or more processors operatively coupled to the memory, the memory and the one or more processors configured to: receive an SRS from a first UE; receive a CLI report from a second UE based at least in part on the SRS; and determine a CLI from an uplink shared channel based at least in part on a power headroom report for the uplink shared channel received from the first UE and the CLI report received from the second UE.

In some aspects, a first UE for wireless communication includes a memory; and one or more processors operatively coupled to the memory, the memory and the one or more processors configured to: receive an SRS configuration from a base station; transmit an SRS at a predefined power based at least in part on the SRS configuration; and transmit, to the base station, a power headroom report for an uplink shared channel, wherein a CLI from the uplink shared channel is to be determined by the base station based at least in part on the power headroom report and a CLI report from a second UE based at least in part on the SRS transmitted by the first UE.

In some aspects, a non-transitory computer-readable medium storing a set of instructions for wireless communication includes one or more instructions that, when executed by one or more processors of a base station, cause the base station to: receive an SRS from a first UE; receive a CLI report from a second UE based at least in part on the SRS; and determine a CLI from an uplink shared channel based at least in part on a power headroom report for the uplink shared channel received from the first UE and the CLI report received from the second UE.

In some aspects, a non-transitory computer-readable medium storing a set of instructions for wireless communication includes one or more instructions that, when executed by one or more processors of a first UE, cause the first UE to: receive an SRS configuration from a base station; transmit an SRS at a predefined power based at least in part on the SRS configuration; and transmit, to the base station, a power headroom report for an uplink shared channel, wherein a CLI from the uplink shared channel is to be determined by the base station based at least in part on the power headroom report and a CLI report from a second UE based at least in part on the SRS transmitted by the first UE.

In some aspects, an apparatus for wireless communication includes means for receiving an SRS from a first user equipment (UE); means for receiving a CLI report from a second UE based at least in part on the SRS; and means for determining a CLI from an uplink shared channel based at least in part on a power headroom report for the uplink shared channel received from the first UE and the CLI report received from the second UE.

In some aspects, a first apparatus for wireless communication includes means for receiving an SRS configuration from a base station; means for transmitting an SRS at a predefined power based at least in part on the SRS configuration; and means for transmitting, to the base station, a power headroom report for an uplink shared channel, wherein a CLI from the uplink shared channel is to be determined by the base station based at least in part on the power headroom report and a CLI report from a second apparatus based at least in part on the SRS transmitted by the first apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
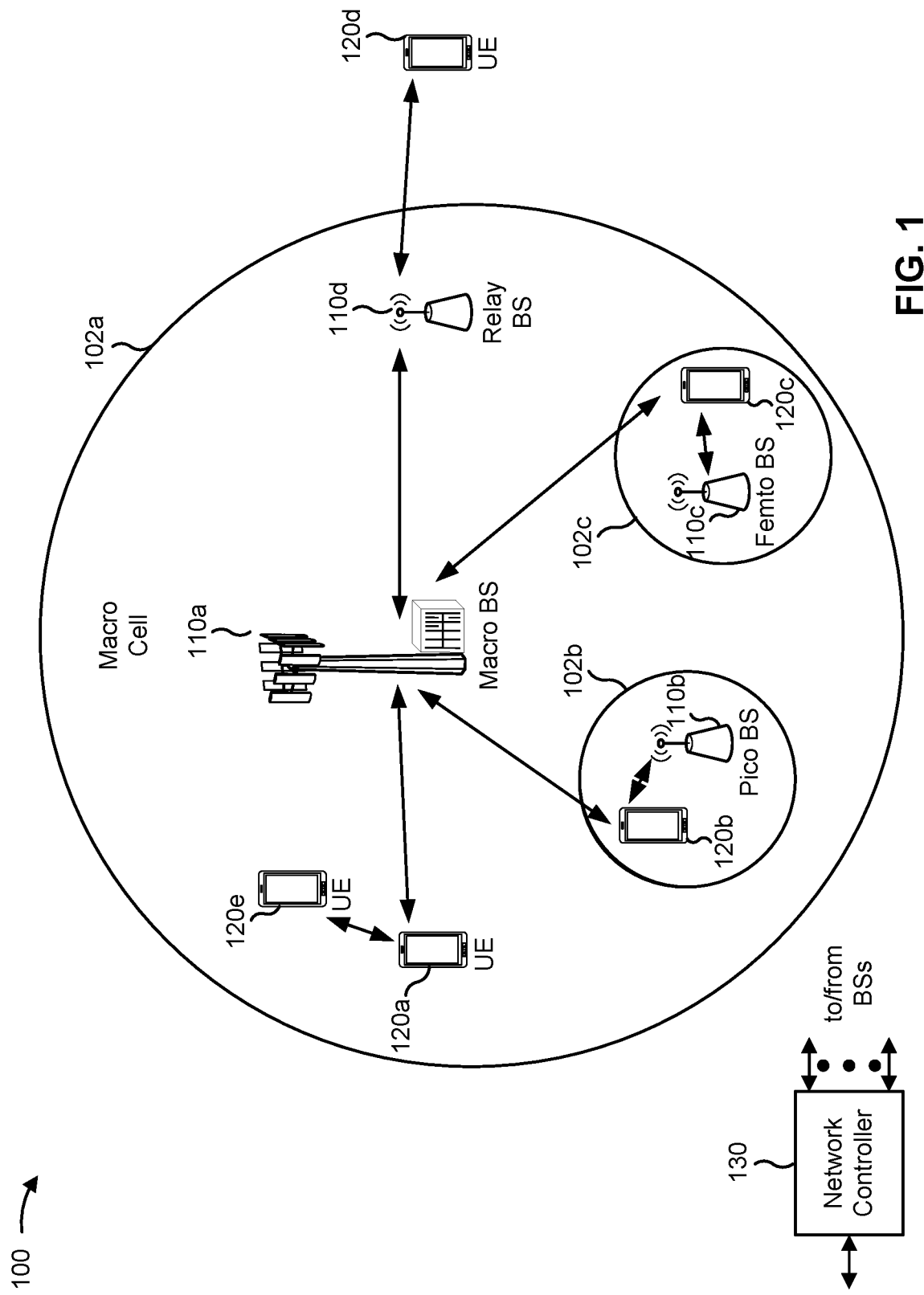
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
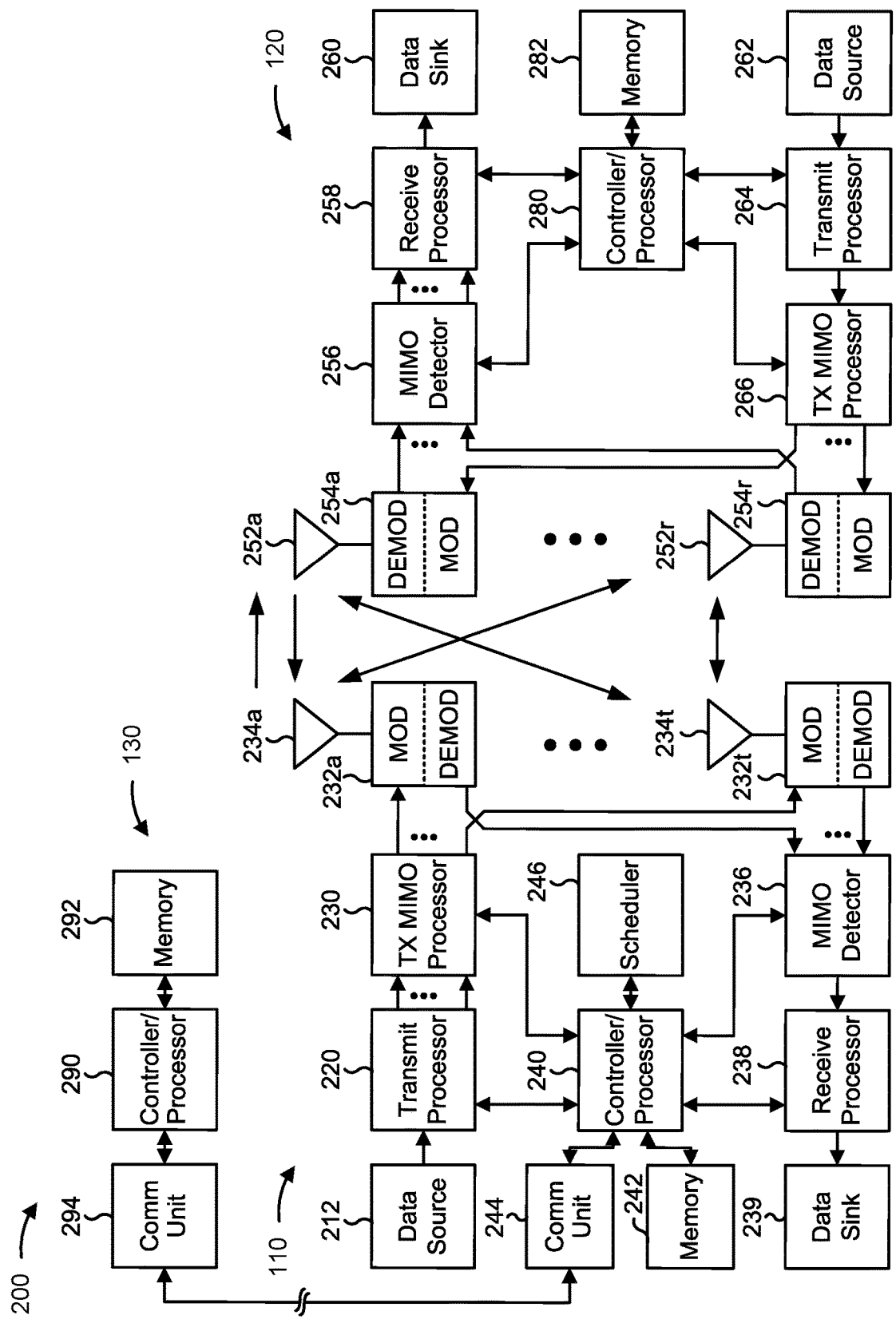
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-10.

Controller/processor 240 of base station 110, controller/processor 280 of UE 120, and/or any other component(s) of FIG. 2 may perform one or more techniques associated with cross-link interference determination for an uplink shared channel, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, a base station (e.g., base station 110) may include means for receiving an SRS from a first user equipment UE, means for receiving a cross-link interference (CLI) report from a second UE based at least in part on the SRS, means for determining a CLI from an uplink shared channel based at least in part on a power headroom report for the uplink shared channel received from the first UE and the CLI report received from the second UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a UE (e.g., UE 120) may include means for receiving an SRS configuration from a base station, means for transmitting an SRS at a predefined power based at least in part on the SRS configuration, means for transmitting, to the base station, a power headroom report for an uplink shared channel, wherein a cross-link interference (CLI) from the uplink shared channel is to be determined by the base station based at least in part on the power headroom report and a CLI report from a second UE based at least in part on the SRS transmitted by the first UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
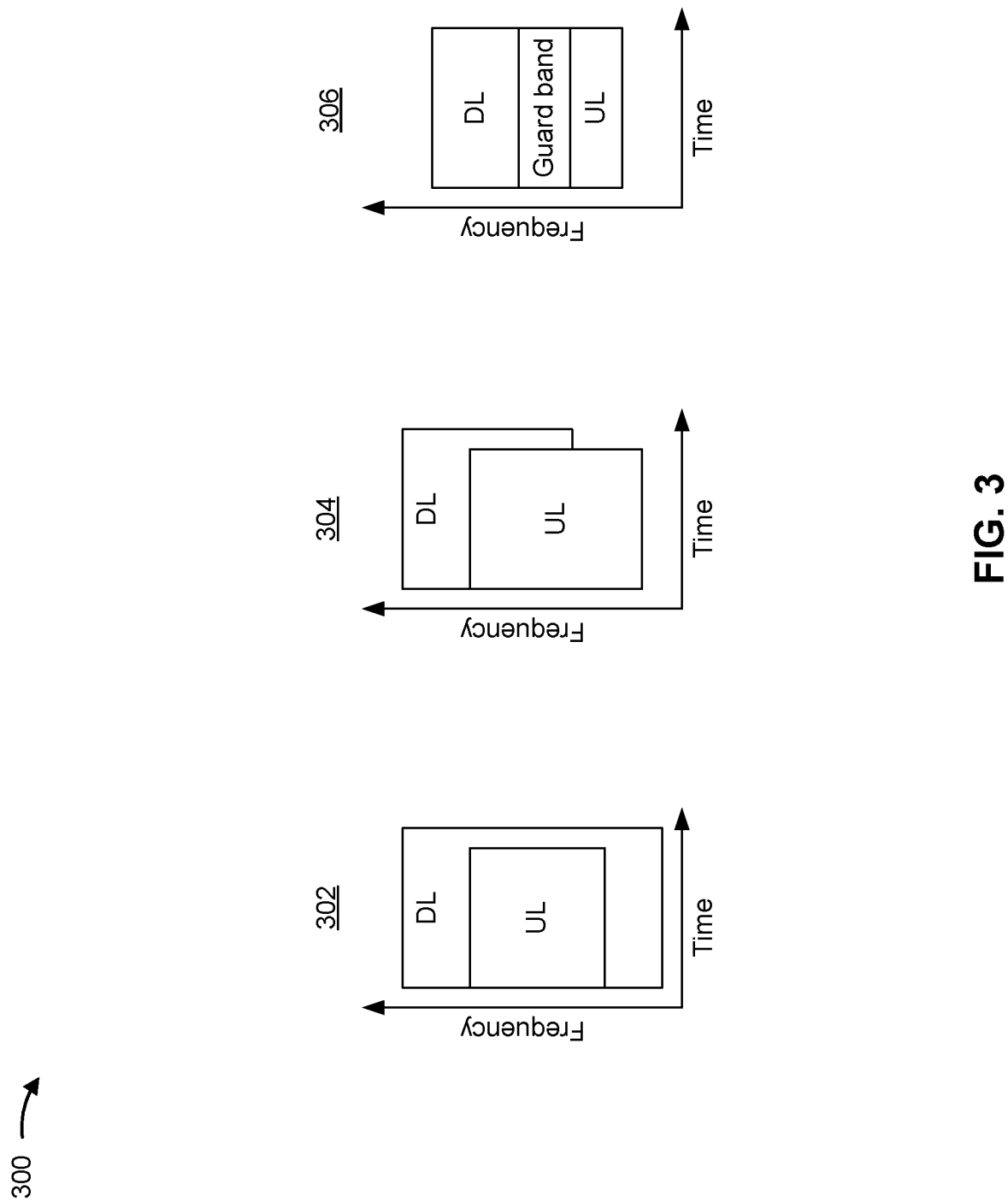
FIG. 3 is a diagram illustrating examples of full duplex communication, in accordance with various aspects of the present disclosure.

FIG. 3 is a diagram illustrating examples 300 of full duplex communication, in accordance with various aspects of the present disclosure.

A UE may operate in an in-band full duplex (IBFD) mode. In the IBFD mode, the UE may transmit and receive on a same time and frequency resource. An uplink and a downlink may share the same time and frequency resource. For example, a time and frequency resource for the uplink may fully overlap with a time and frequency resource for the downlink (as shown by reference number 302), or a time and frequency resource for the uplink may partially overlap with a time and frequency resource for the downlink (as shown by reference number 304).

A UE may operate in a sub-band frequency division duplex (SBFD) mode (or a flexible duplex mode). In the SBFD mode, the UE may transmit and receive at a same time, but the UE may transmit and receive on a different frequency resource. A downlink resource may be separated from an uplink resource by a guard band in a frequency domain (as shown by reference number 306).

As indicated above, FIG. 3 is provided as an example. Other examples may differ from what is described with regard to FIG. 3.

Figure 4:
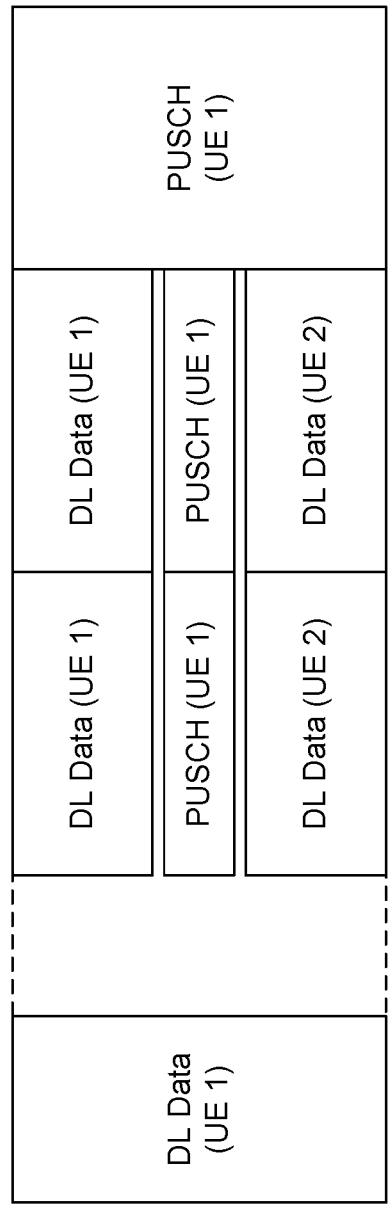
FIG. 4 is a diagram illustrating an example of a slot format, in accordance with various aspects of the present disclosure.

FIG. 4 is a diagram illustrating an example 400 of a slot format, in accordance with various aspects of the present disclosure.

A slot may be defined in accordance with the slot format. The slot format may be a downlink and uplink ('D+U') slot. The downlink and uplink slot may be a slot in which a band may be used for both uplink and downlink transmissions. The downlink and uplink transmissions can occur in overlapping bands (e.g., in the IBFD mode) or adjacent bands (e.g., in the SBFD mode). In a downlink and uplink slot, a half-duplex UE may transmit in an uplink band or receive in a downlink band. In a downlink and uplink slot, a full-duplex UE may transmit in an uplink band and/or receive in a downlink band of the downlink and uplink slot (e.g., the same downlink and uplink slot). The downlink and uplink slot may include downlink-only symbols, uplink-only symbols or full-duplex symbols.

In the example shown in FIG. 4, a full-duplex UE (UE 1) may use downlink and uplink slot(s) to receive downlink data and transmit on a physical uplink shared channel (PUSCH) at a same time but on a different frequency resource. A half-duplex UE (UE 2) may use downlink and uplink slot(s) to receive downlink data or transmit on a PUSCH at different times and on different frequency resources.

As shown in FIG. 4, a first slot (e.g., a downlink and uplink slot) may correspond to a reception of downlink data at the first UE, a second and third slot may correspond to an uplink transmission (e.g., a PUSCH transmission) of the first UE and a reception of downlink data at the second UE, and the fourth slot may correspond to an uplink transmission of the first UE.

As indicated above, FIG. 4 is provided as an example. Other examples may differ from what is described with regard to FIG. 4.

Figure 5:
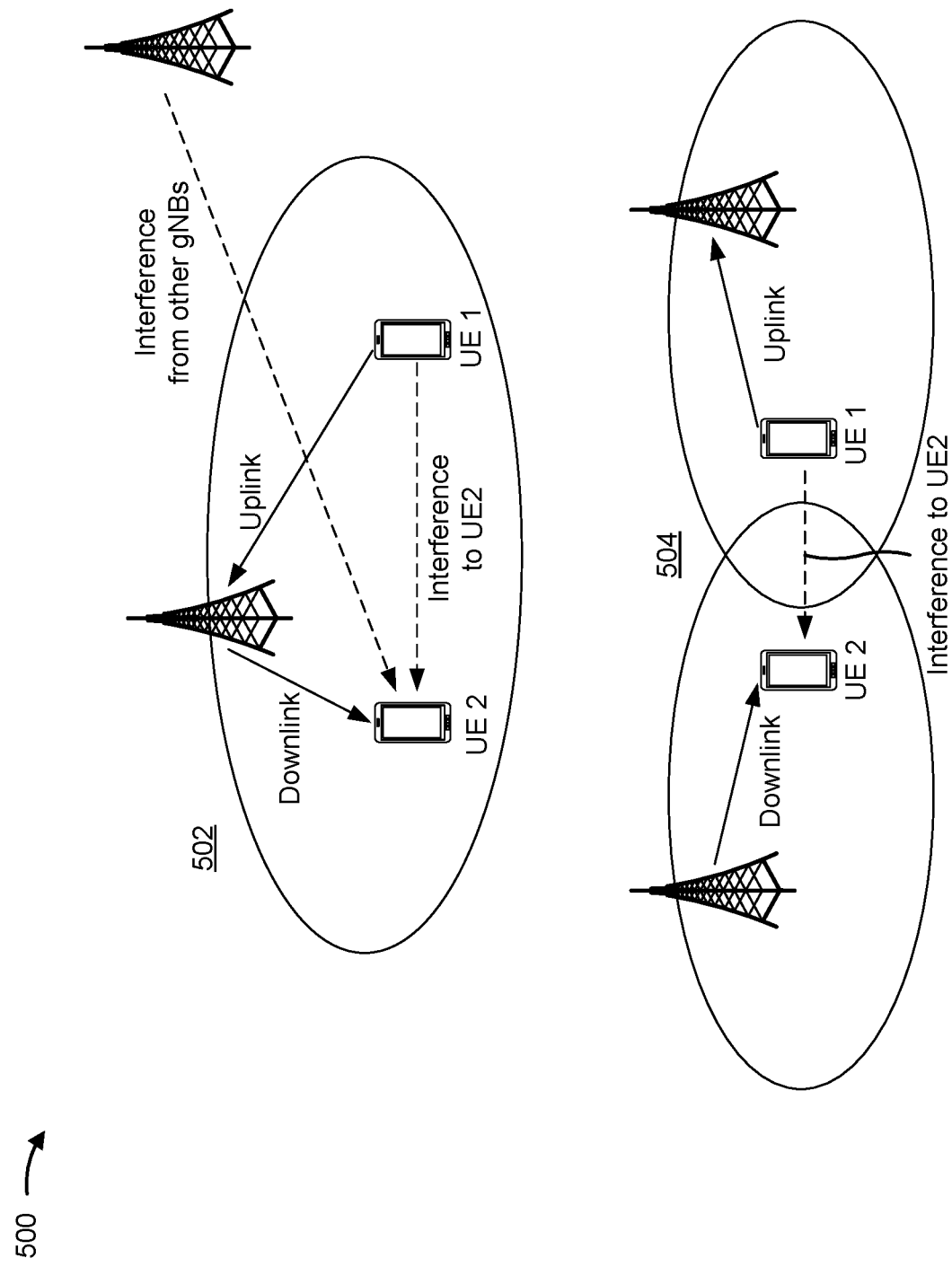
FIG. 5 is a diagram illustrating an example of interference sources at a UE, in accordance with various aspects of the present disclosure.

FIG. 5 is a diagram illustrating an example 500 of interference sources at a UE, in accordance with various aspects of the present disclosure.

As shown by reference number 502, a full-duplex base station, such as a base station operating in an SBFD mode or an IBFD mode, may communicate with one or more UEs operating in a half-duplex mode. For example, the base station may receive information in an uplink from a first UE (UE 1) in a cell. The base station may transmit information in a downlink to a second UE (UE 2) in the same cell. The first UE and/or the second UE may be subjected to interference from various sources. The first UE and/or the second UE may be subjected to inter-cell interference from other base stations, such as neighboring base stations. The first UE and/or the second UE may be subjected to intra-cell CLI from other UEs in the same cell. For example, an uplink transmission associated with the first UE may cause intra-cell CLI to the second UE that is receiving information in the downlink.

In some aspects, CLI may occur when one UE, referred to herein as an aggressor UE, is transmitting in a first direction, while another UE, referred to herein as a victim UE, is receiving in a second direction that is opposite to the first direction.

As shown by reference number 504, a first UE and/or a second UE may be subjected to inter-cell CLI. For example, the first UE may be in a first cell and the second UE may be in a second cell that is adjacent to the first cell. An uplink transmission associated with the first UE may cause inter-cell CLI to the second UE that is receiving information in the downlink. In other words, inter-cell CLI may result from other UEs in adjacent cells.

A full-duplex UE may be subjected to self-interference. For example, a full-duplex UE that transmits and receives at a same time and/or frequency resource may be subjected to self-interference. In other words, uplink transmissions of the full-duplex UE may interfere with downlink transmissions of the full-duplex UE.

As indicated above, FIG. 5 is provided as an example. Other examples may differ from what is described with regard to FIG. 5.

Figure 6:
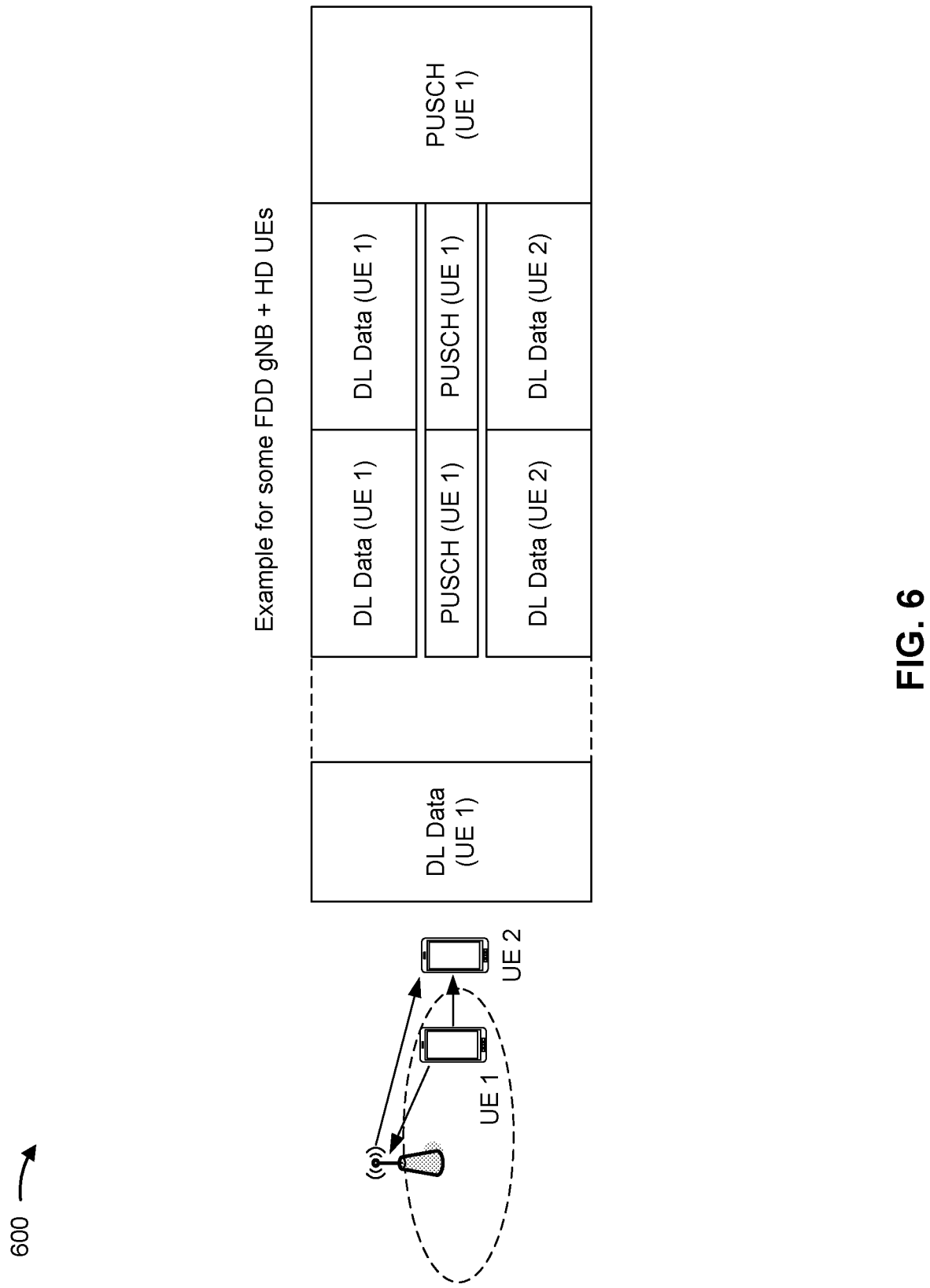
FIG. 6 is a diagram illustrating an example of intra-cell CLI, in accordance with various aspects of the present disclosure.

FIG. 6 is a diagram illustrating an example 600 of intra-cell CLI, in accordance with various aspects of the present disclosure.

As shown in FIG. 6, in an SBFD mode or an IBFD mode, a base station may configure a downlink transmission to a second UE in frequency domain resources adjacent to frequency domain resources configured for an uplink transmission of a first UE. The first and second UEs may be included in a same cell served by the base station. For example, in the SBFD mode, the second UE may perform the uplink transmission (e.g., transmit on a PUSCH) within a band, and the first UE may receive downlink data from the base station in adjacent frequency domain resources. As a result, the uplink transmission of the first UE may cause intra-cell CLI to a downlink reception at the second UE.

As shown in FIG. 6, a first slot (e.g., a downlink and uplink slot) may correspond to a reception of downlink data at the first UE, a second and third slot may correspond to an uplink transmission (e.g., a PUSCH transmission) of the first UE and a reception of downlink data at the second UE, and the fourth slot may correspond to an uplink transmission of the first UE.

As indicated above, FIG. 6 is provided as an example. Other examples may differ from what is described with regard to FIG. 6.

Figure 7:
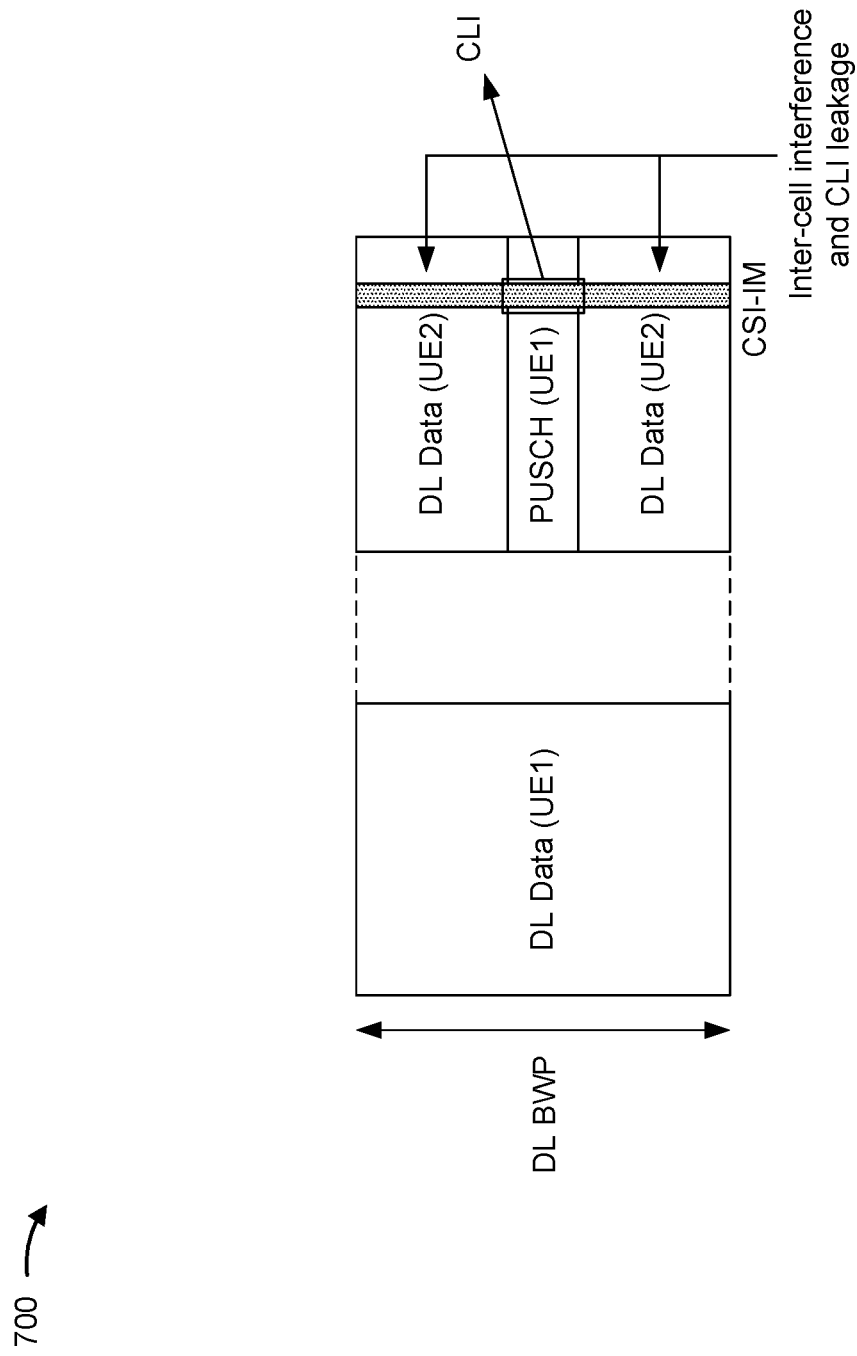
FIG. 7 is a diagram illustrating an example of a channel state information interference management (CSI-IM) resource for interference power measurements, in accordance with various aspects of the present disclosure.

FIG. 7 is a diagram illustrating an example 700 of a CSI-IM resource for interference power measurements, in accordance with various aspects of the present disclosure.

Intra-cell CLI, which may limit a UE performance, may involve CLI from uplink transmissions of nearby UEs in an IBFD mode, and/or CLI leakage to a downlink in an SBFD mode. A base station may mitigate an effect of CLI by configuring CSI-IM resources in an uplink and/or a downlink of a full-duplex slot. The CSI-IM resources may enable UEs (e.g., full-duplex-aware UEs and/or full-duplex UEs) to measure different components of inter and intra interference. In other words, UEs may use the CSI-IM resources configured by the base station to measure different components of interference.

In the example shown in FIG. 7, interference corresponding to an uplink transmission may be due to CLI, whereas interference corresponding to downlink receptions may be due to a combination of inter-cell interference and CLI leakage. The interference corresponding to the uplink transmission and the downlink receptions may be measured using CSI-IM resources configured by the base station.

A UE may measure an interference power in the configured CSI-IM resources, and the UE may calculate a contribution of CLI. The UE may calculate the contribution of CLI based at least in part on a wideband or sub-band RSSI. The configured CSI-IM resources may enable the UE to accurately calculate the CLI, which may be reported by the UE to the base station. The base station may use reported CLI information when scheduling upcoming slots for the UE.

As indicated above, FIG. 7 is provided as an example. Other examples may differ from what is described with regard to FIG. 7.

A CLI measurement may be performed based at least in part on a sounding reference signal (SRS), but performing the CLI measurement based at least in part on the SRS may not accurately capture CLI from a PUSCH transmission.

A power associated with the SRS may have a relationship to a power associated with the PUSCH transmission, as described below.

A UE may transmit a PUSCH on an active uplink bandwidth part (BWP) b of carrier f of serving cell c using a parameter set configuration with index j and a PUSCH power control adjustment state with index l. The UE may determine a PUSCH transmission power $P_{PUSCH,b,f,c}(i, j, q_d, l)$ in a PUSCH transmission occasion i as:

$$P_{PUSCH,b,f,c}(i, j, q_d, l) = \min \left\{ \begin{array}{l} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{array} \right\}.$$

With respect to the PUSCH transmission power $P_{PUSCH,b,f,c}(i, j, q_d, l)$ (in dB), $P_{O\_PUSCH,b,f,c}(j)$ may represent a P0 value for controlling a received power level, $a_{b,f,c}(j)$ may represent an alpha value for partial pathloss (PL) compensation, $PL_{b,f,c}(q_d)$ may represent a pathloss value based at least in part on a measured downlink reference signal with index $q_d$, $\Delta_{TF,b,f,c}(i)$ may depend on a resource allocation and a modulation and coding scheme (MCS) of the PUSCH, and $f_{b,f,c}(i,l)$ may represent a close loop power control based at least in part on transmit power control (TPC) commands with a closed loop index l.

A UE may transmit an SRS based at least in part on a configuration by SRS-ResourceSet on an active UL BWP b of carrier f of serving cell c using SRS power control adjustment state with index l. The UE may determine the SRS transmission power $P_{SRS,b,f,c}(i,q_s,l)$ in SRS transmission occasion i as:

$$P_{SRS,b,f,c}(i, q_d, l) =$$
$$\min\begin{Bmatrix} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{Bmatrix}.$$

With respect to the SRS transmission power $P_{SRS,b,f,c}(i, q_s, l)$ (in dB), $P_{CMAX,f,c}(i)$ may be a UE configured maximum output power for carrier f of serving cell c in SRS transmission occasion i, $P_{O\_SRS,b,f,c}(q)$ may be provided by p0 for an active UL BWP b of carrier f of serving cell c and SRS resource set $q_s$ provided by SRS-ResourceSet and SRS-ResourceSetId, $M_{SRS,b,f,c}(i)$ may be an SRS bandwidth expressed in a number of resource blocks for SRS transmission occasion i on active UL BWP b of carrier f of serving cell c and $\mu$ is a SCS configuration, $\alpha_{SRS,b,f,c}(q_s)$ may be provided by alpha for active UL BWP b of carrier f of serving cell c and SRS resource set $q_s$, and $PL_{b,f,c}(q_d)$ may be a downlink pathloss estimate in dB calculated by the UE using RS resource index $q_d$. Further, for the SRS power control adjustment state for active UL BWP b of carrier f of serving cell C and SRS transmission occasion i, $h_{b,f,c}(i,l)=f_{b,f,c}(i,l)$, where $f_{b,f,c}(i,l)$ may be the current PUSCH power control adjustment state, if an srs-PowerControlAdjustmentStates parameter indicates a same power control adjustment state for SRS transmissions and PUSCH transmissions.

An SRS power control adjustment may indicate a same power state for both SRS transmissions and PUSCH transmissions. Further, a power headroom report (PHR) transmitted by a UE may be based at least in part on a corresponding PUSCH transmission.

When a UE determines that a Type 1 PHR for an activated serving cell is based at least in part on an actual PUSCH transmission, for a PUSCH transmission occasion i on an active uplink BWP b of carrier f of serving cell c, the UE may compute the Type 1 PHR as:

$$PH_{type1,b,f,c}(i, j, q_d, l) =$$
$$P_{CMAX,f,c}(i) - \{P_{O\_PUSCH,b,f,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}$$

With respect to the Type 1 PHR (in dB) based at least in part on an actual PUSCH transmission, $P_{CMAX,f,c}(i)$ may represent a UE configured maximum output power after backoff due to power management (e.g., backoff due to a maximum power reduction), and $P_{O\_PUSCH,b,f,c}(j)$, $M_{RB,b,f,c}^{PUSCH}(i)$, $\alpha_{b,f,c}(j)$, $PL_{b,f,c}(q_d)$, $\Delta_{TF,b,f,c(i)}$ and $f_{b,f,c}(i,l)$ may be parameters used to determine a PUSCH transmit power. Further, $PL_{b,f,c}(q_d)$ may be a downlink pathloss estimate in dB calculated by the UE using RS resource index $q_d$ for the active DL BWP of serving cell c and SRS resource set $q_s$.

The PHR may be a function of the UE configured maximum output power and a path loss ($PL_{b,f,c}(q_d)$).

As previously described, an aggressor UE may cause CLI to a victim UE when the aggressor UE performs a PUSCH transmission in frequency domain resources adjacent to frequency domain resources used by the victim UE to perform a downlink reception. The victim UE may perform a CLI measurement based at least in part on an SRS, but performing the CLI measurement based at least in part on the SRS may not accurately capture CLI from the PUSCH transmission associated with the aggressor UE. In other words, the victim UE may not account for CLI from the PUSCH transmission when measuring the CLI based at least in part on the SRS. As a result, the victim UE may determine an incomplete CLI and report that incomplete CLI to a base station, which may make scheduling decisions in upcoming slots for the victim UE based at least in part on that incomplete CLI.

In various aspects of techniques and apparatuses described herein, a base station may estimate a CLI based at least in part on a CLI report received from a victim UE, where the estimated CLI may account for a PUSCH transmission from an aggressor UE. For example, the aggressor UE may transmit an SRS with a maximum allowed power. The victim UE may measure a CLI based at least in part on the SRS. The victim UE may generate the CLI report based on the SRS and a coupling loss between the victim UE and the aggressor UE. The victim UE may transmit the CLI report to the base station. The aggressor UE may transmit a PHR to the base station, where the PHR may be based at least in part on the PUSCH transmission from the aggressor UE. The base station may estimate (e.g., interpolate) an actual interference from the PUSCH transmission based at least in part on the PHR. The base station may adjust (e.g., reduce or increase) a CLI value indicated in the CLI report received from the victim UE based at least in part on the actual interference from the PUSCH transmission. As a result, the base station may modify the CLI report received from the victim UE to more accurately reflect an actual CLI experienced at the victim UE, which may benefit scheduling decisions performed by the base station for the victim UE.

Figure 8:
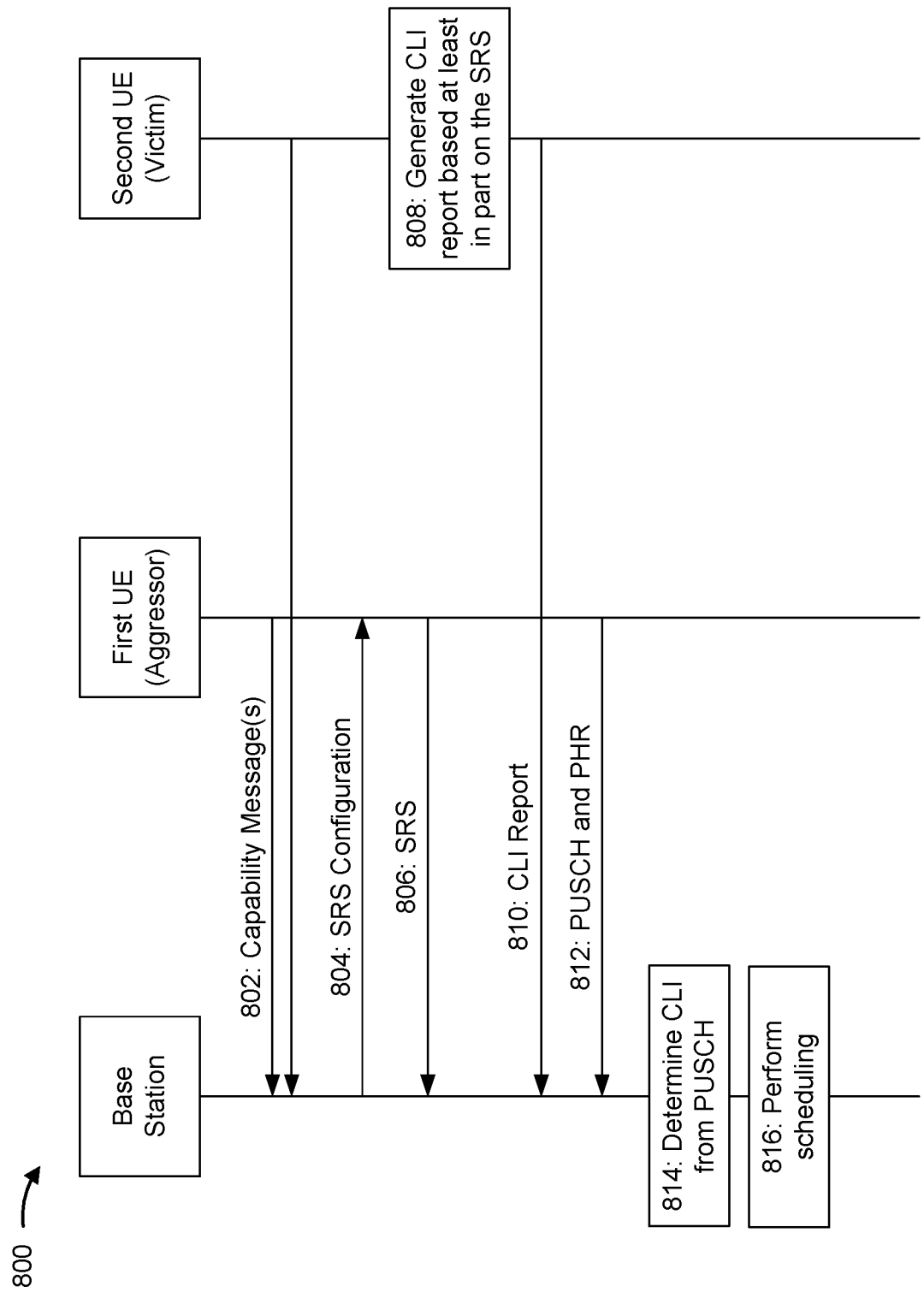
FIG. 8 is a diagram illustrating an example associated with cross-link interference determination for an uplink shared channel, in accordance with various aspects of the present disclosure.

FIG. 8 is a diagram illustrating an example 800 associated with cross-link interference determination for an uplink shared channel, in accordance with various aspects of the present disclosure. As shown in FIG. 8, example 800 includes communication between a base station (e.g., base station 110), a first UE (e.g., UE 120a), and a second UE (e.g., 120e). In some aspects, the base station, the first UE, and the second UE may be included in a wireless network such as wireless network 100. The base station, the first UE, and the second UE may communicate on a wireless access link, which may include an uplink and a downlink.

In some aspects, the base station may perform downlink transmissions with the second UE, as well as receive uplink transmissions from the first UE. In some cases, the uplink transmissions from the first UE may cause intra-cell interference to the second UE. In other words, downlink receptions at the second UE may be impacted by intra-cell interference from the first UE. In this case, the first UE may be an aggressor UE and the second UE may be a victim UE.

As shown by reference number 802, the base station may receive one or more capability messages from the first UE and/or the second UE. In some aspects, the base station may receive, from the first UE, a capability message indicating that the first UE supports an SRS configuration from the base station via an RRC configuration, a special SRS TPC command, or group common downlink control information (DCI). The SRS configuration may be associated with a defined power, such as a maximum power allowed at the UE. In some aspects, the base station may receive, from the first UE, a capability message indicating that the first UE supports power headroom reporting based at least in part on the SRS transmitted from the first UE. In other words, the first UE may indicate support for power headroom reporting triggered by an SRS transmission associated with the defined power (e.g., the maximum power allowed at the UE). In some aspects, the base station may receive, from the first UE, a capability message indicating that the first UE supports transmitting the SRS in accordance with a repetition. Each repetition of the SRS may be configured to be associated with a different transmit power, a different transmit beam, and/or a different transmission configuration indicator (TCI) state with respect to other repetitions of the SRS.

In some aspects, the base station may receive, from the second UE, a capability message indicating that the second UE is capable of performing a CLI measurement using a CSI-IM resource. For example, the CSI-IM resource may be configured for the second UE by the base station, and the CSI-IM resource may enable the second UE to perform a CLI measurement for reporting to the base station.

As shown by reference number 804, the base station may transmit, to the first UE, an SRS configuration that instructs the first UE to transmit an SRS at a predefined power. The predefined power may be a maximum power allowed by the base station and/or at the first UE. The base station may transmit the SRS configuration to the first UE based at least in part on a capability message received from the first UE.

In some aspects, the SRS configuration transmitted by the base station may be an RRC configuration that semi-statically configures the first UE with SRS resources dedicated for CLI measurement. The RRC configuration may include a field that indicates that the SRS is to be transmitted at the predefined power or in accordance with a power control mechanism. For example, a maximum power parameter may be added to an SRS Power Control Adjustment States parameter to indicate that the SRS is to be transmitted at the predefined power.

In some aspects, the SRS configuration transmitted by the base station may be transmitted via a special SRS TPC command that configures the first UE to transmit the SRS at the predefined power. The TPC command may be transmitted via a UE-specific DCI or via a group common DCI that triggers an SRS transmission from the first UE.

In some aspects, the SRS configuration transmitted by the base station may be transmitted via a group common DCI that triggers the SRS to be transmitted at the predefined power. For example, the group common DCI may trigger the SRS to be transmitted from the first UE.

In some aspects, the SRS configuration transmitted by the base station may configure an SRS transmission from the first UE with intra-slot repetition and/or inter-slot repetition. In other words, the SRS configuration may indicate a repetition at which the first UE is to transmit the SRS, where the repetition may correspond to the intra-slot repetition or the inter-slot repetition.

In some aspects, the base station may configure each repetition of the SRS to be transmitted by the first UE in accordance with a preconfigured list of transmit powers. For example, the preconfigured list of transmit powers may include P_max, P_max/2, and so on, where P_max indicates a maximum allowed power. In some aspects, the base station may configure each repetition of the SRS to be transmitted by the first UE in accordance with a different TCI state as compared to another repetition of the SRS.

As shown by reference number 806, the first UE may transmit an SRS to the base station. The first UE may transmit the SRS with a predefined power, such as maximum power allowed by the base station and/or at the first UE. The first UE may transmit the SRS in accordance with the SRS configuration received from the base station.

As shown by reference number 808, the second UE may generate a CLI report based at least in part on the SRS transmitted by the first UE. The CLI report may include an indication of CLI experienced at the second UE. The first UE and the second UE may be in a same cell served by the base station, and the SRS transmission from the first UE may cause intra-cell CLI to the second UE. In other words, the SRS transmission from the first UE may be an uplink transmission that causes intra-cell CLI for downlink receptions at the second UE. The second UE may perform a CLI measurement based at least in part on the SRS, and the second UE may generate the CLI report to include the CLI measurement.

As shown by reference number 810, the second UE may transmit the CLI report to the base station.

In some aspects, the second UE may measure and report CLI for different transmit powers. For example, the first UE may transmit the SRS with repetition, where each repetition may be transmitted in accordance with the preconfigured list of transmit powers. In this case, the second UE may measure and report CLI for the different transmit powers associated with repetitions of the SRS.

In some aspects, the second UE may measure and report CLI for different transmit beams. For example, the first UE may transmit the SRS with repetition, where each repetition may be transmitted with a different transmit beam in relation to other repetitions of the SRS. In this case, the second UE may measure and report CLI for the different transmit beams associated with repetitions of the SRS.

As shown by reference number 812, the first UE may perform a PUSCH transmission with the base station. In other words, the first UE may transmit information to the base station via the PUSCH. Additionally, the first UE may calculate a PHR based at least in part on the PUSCH transmission, and the first UE may transmit the PHR to the base station. The PHR may indicate a remaining transmission power for a subframe (e.g., a difference between a nominal UE maximum transmit power and an estimated power of a current PUSCH transmission). In some aspects, the base station may define a triggering event for power headroom reporting, where the triggering event may occur when the first UE transmits the SRS. The base station may receive the PHR from the first UE based at least in part on an occurrence of the triggering event.

As shown by reference number 814, the base station may determine a CLI from the PUSCH based at least in part on the PHR for the PUSCH received from the first UE and the CLI report received from the second UE. For example, the base station may estimate (e.g., interpolate) an actual interference from the PUSCH based at least in part on the PHR and the CLI report. The base station may adjust (e.g., reduce or increase) the CLI measurement indicated in the CLI report received from the second UE. The base station may adjust the CLI measurement based at least in part on the actual interference from the PUSCH and a power associated with the PUSCH, as indicated in the PHR. By adjusting the CLI measurement, the base station may determine an adjusted CLI measurement from the PUSCH.

In some aspects, the base station may receive, from the second UE, an indication of CLI for different transmit powers associated with the first UE, which may enable the base station to estimate an average coupling loss between the first UE and the second UE, as well as estimate CLI values for different transmit powers associated with the first UE. In some aspects, the base station may receive, from the second UE, an indication of CLI for different transmit beams associated with the first UE, which may enable the base station to estimate a coupling loss between first UE and the second UE, as well as estimate CLI values for different transmit beams associated with the first UE.

As shown by reference number 816, the base station may perform scheduling for the first UE and/or the second UE based at least in part on the CLI determined for the PUSCH. In other words, the base station may perform scheduling for the first UE and/or the second UE based at least in part on the adjusted CLI measurement from the PUSCH.

As indicated above, FIG. 8 is provided as an example. Other examples may differ from what is described with regard to FIG. 8.

Figure 9:
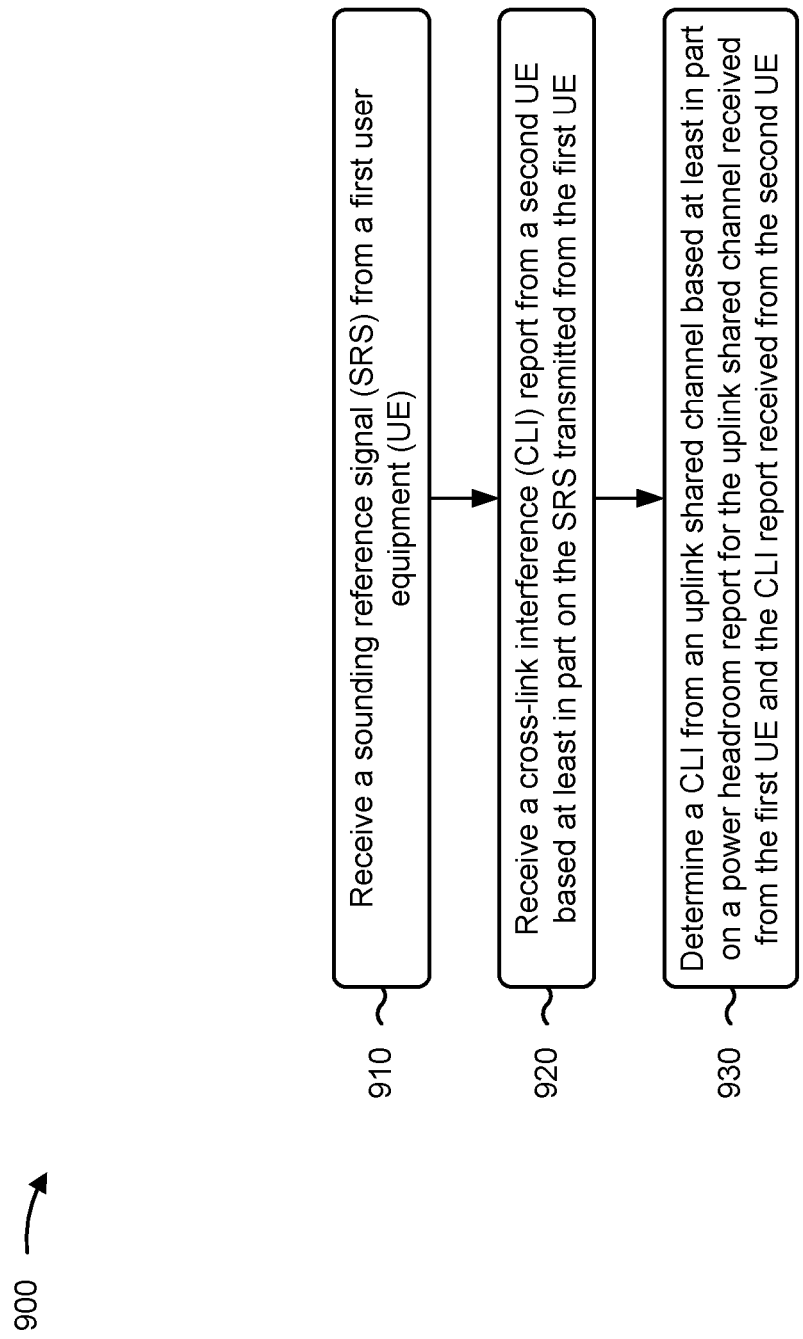
FIGS. 9-10 are diagrams illustrating example processes associated with cross-link interference determination for an uplink shared channel, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110) performs operations associated with cross-link interference determination for an uplink shared channel.

As shown in FIG. 9, in some aspects, process 900 may include receiving an SRS from a first UE (block 910). For example, the base station (e.g., using antenna 234, demodulator 232, MIMO detector 236, receive processor 238, controller/processor 240, and/or memory 242) may receive a sounding reference signal (SRS) from a first UE, as described above.

As further shown in FIG. 9, in some aspects, process 900 may include receiving a CLI report from a second UE based at least in part on the SRS (block 920). For example, the base station (e.g., using antenna 234, demodulator 232, MIMO detector 236, receive processor 238, controller/processor 240, and/or memory 242) may receive a CLI report from a second UE based at least in part on the SRS, as described above.

As further shown in FIG. 9, in some aspects, process 900 may include determining a CLI from an uplink shared channel based at least in part on a power headroom report for the uplink shared channel received from the first UE and the CLI report received from the second UE (block 930). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a CLI from an uplink shared channel based at least in part on a power headroom report for the uplink shared channel received from the first UE and the CLI report received from the second UE, as described above.

Process 900 may include additional aspects, such as any single aspect or any combination of aspects described below and/or in connection with one or more other processes described elsewhere herein.

In a first aspect, process 900 includes scheduling an upcoming slot for one or more of the first UE or the second UE based at least in part on the CLI determined from the uplink shared channel.

In a second aspect, alone or in combination with the first aspect, determining the CLI comprises estimating an actual interference from the uplink shared channel based at least in part on the power headroom report and the CLI report, and adjusting a CLI value indicated in the CLI report based at least in part on the actual interference from the uplink shared channel and a power associated with the uplink shared channel.

In a third aspect, alone or in combination with one or more of the first and second aspects, process 900 includes transmitting, to the first UE, an SRS configuration that enables the first UE to transmit the SRS at a predefined power.

In a fourth aspect, alone or in combination with one or more of the first through third aspects, the predefined power is a maximum power allowed at the UE.

In a fifth aspect, alone or in combination with one or more of the first through fourth aspects, the SRS configuration is an RRC configuration that semi-statically configures the first UE with SRS resources dedicated for CLI measurement, wherein the RRC configuration includes a field that indicates that the SRS is to be transmitted at the predefined power.

In a sixth aspect, alone or in combination with one or more of the first through fifth aspects, the SRS configuration is transmitted via a special SRS TPC command that configures the first UE to transmit the SRS at the predefined power.

In a seventh aspect, alone or in combination with one or more of the first through sixth aspects, the SRS configuration is transmitted via a group common DCI that triggers the SRS to be transmitted at the predefined power.

In an eighth aspect, alone or in combination with one or more of the first through seventh aspects, the SRS configuration indicates a repetition at which the first UE is to transmit the SRS, wherein the repetition corresponds to an intra-slot repetition or an inter-slot repetition.

In a ninth aspect, alone or in combination with one or more of the first through eighth aspects, each repetition of the SRS is to be transmitted by the first UE in accordance with a preconfigured list of transmit powers.

In a tenth aspect, alone or in combination with one or more of the first through ninth aspects, each repetition of the SRS is to be transmitted by the first UE in accordance with a different transmission configuration indicator (TCI) state as compared to another repetition of the SRS.

In an eleventh aspect, alone or in combination with one or more of the first through tenth aspects, process 900 includes receiving the power headroom report from the first UE based at least in part on an occurrence of a triggering event, wherein the triggering event occurs when the SRS is transmitted by the first UE.

In a twelfth aspect, alone or in combination with one or more of the first through eleventh aspects, process 900 includes receiving, from the second UE, a capability message indicating that the second UE is capable of performing a CLI measurement using a CSI-IM resource, wherein the CLI report received from the second UE is based at least in part on the CLI measurement performed using the CSI-IM resource.

In a thirteenth aspect, alone or in combination with one or more of the first through twelfth aspects, process 900 includes receiving, from the first UE, a capability message indicating that the first UE supports an SRS configuration from the base station via one or more of a RRC configuration, a special SRS TPC command, or group common downlink control information.

In a fourteenth aspect, alone or in combination with one or more of the first through thirteenth aspects, process 900 includes receiving, from the first UE, a capability message indicating that the first UE supports power headroom reporting based at least in part on the SRS transmitted from the first UE.

In a fifteenth aspect, alone or in combination with one or more of the first through fourteenth aspects, process 900 includes receiving, from the first UE, a capability message indicating that the first UE supports transmitting the SRS in accordance with a repetition, wherein each repetition of the SRS is configured to be associated with one or more of a different transmit power or a different transmission configuration indicator (TCI) state.

In a sixteenth aspect, alone or in combination with one or more of the first through fifteenth aspects, the first UE is an aggressor UE and the second UE is a victim UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
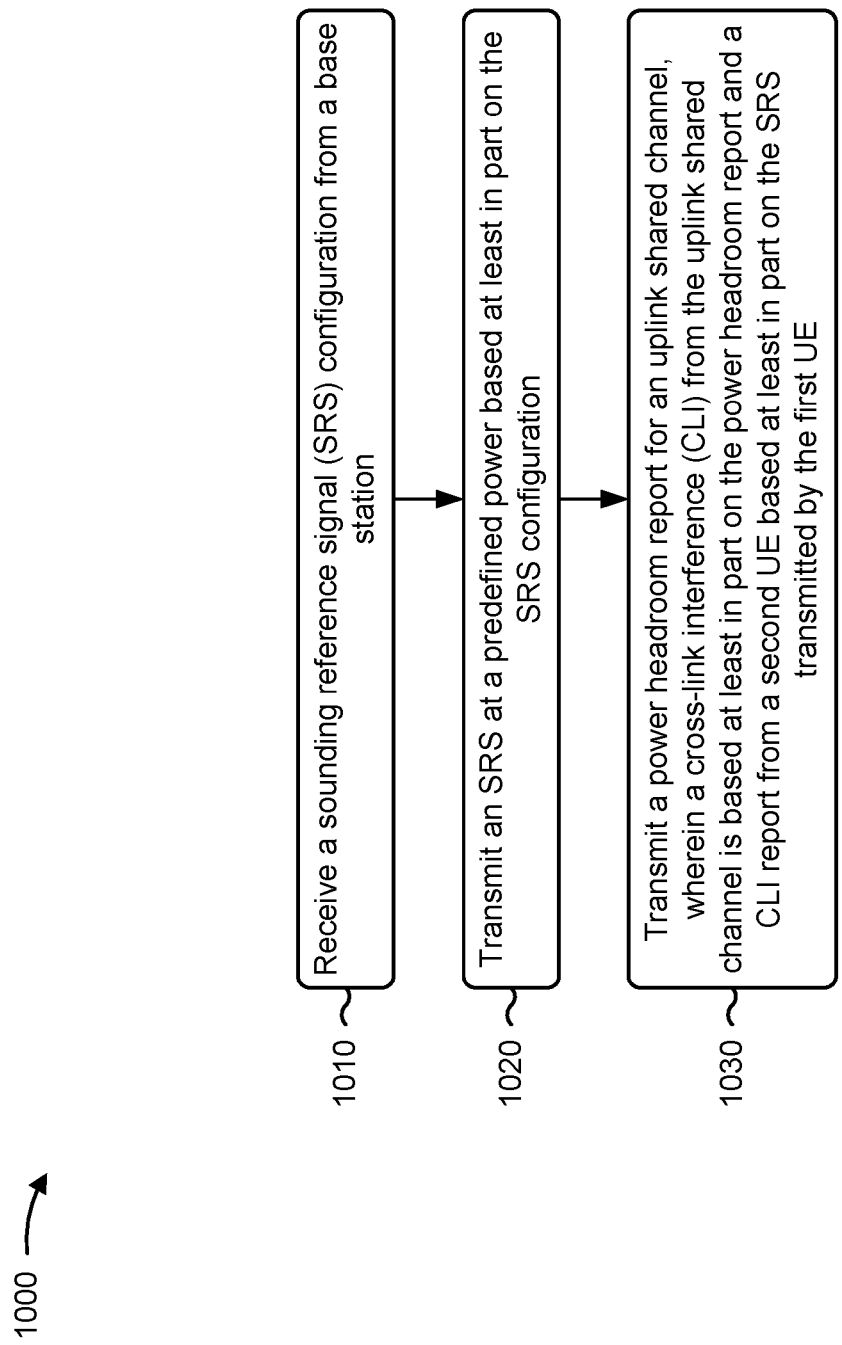

FIG. 10 is a diagram illustrating an example process 1000 performed, for example, by a first UE, in accordance with various aspects of the present disclosure. Example process 1000 is an example where the first UE (e.g., first UE 120) performs operations associated with cross-link interference determination for an uplink shared channel.

As shown in FIG. 10, in some aspects, process 1000 may include receiving an SRS configuration from a base station (block 1010). For example, the first UE (e.g., using antenna 252, demodulator 254, MIMO detector 256, receive processor 258, controller/processor 280, and/or memory 282) may receive an SRS configuration from a base station, as described above.

As further shown in FIG. 10, in some aspects, process 1000 may include transmitting an SRS at a predefined power based at least in part on the SRS configuration (block 1020). For example, the first UE (e.g., using antenna 252, transmit processor 264, TX MIMO processor 266, modulator 254, controller/processor 280, and/or memory 282) may transmit an SRS at a predefined power based at least in part on the SRS configuration, as described above.

As further shown in FIG. 10, in some aspects, process 1000 may include transmitting, to the base station, a power headroom report for an uplink shared channel, wherein a CLI from the uplink shared channel is to be determined by the base station based at least in part on the power headroom report and a CLI report from a second UE based at least in part on the SRS transmitted by the first UE (block 1030). For example, the first UE (e.g., using antenna 252, transmit processor 264, TX MIMO processor 266, modulator 254, controller/processor 280, and/or memory 282) may transmit, to the base station, a power headroom report for an uplink shared channel, wherein a CLI from the uplink shared channel is to be determined by the base station based at least in part on the power headroom report and a CLI report from a second UE based at least in part on the SRS transmitted by the first UE, as described above.

Process 1000 may include additional aspects, such as any single aspect or any combination of aspects described below and/or in connection with one or more other processes described elsewhere herein.

In a first aspect, the predefined power is a maximum power allowed at the UE.

In a second aspect, alone or in combination with the first aspect, the SRS configuration is an RRC configuration that semi-statically configures the first UE with SRS resources dedicated for CLI measurement, wherein the RRC configuration includes a field that indicates the SRS is to be transmitted at the predefined power.

In a third aspect, alone or in combination with one or more of the first and second aspects, the SRS configuration is received via a special SRS TPC command that configures the first UE to transmit the SRS at the predefined power.

In a fourth aspect, alone or in combination with one or more of the first through third aspects, the SRS configuration is received via a group common DCI that triggers the SRS to be transmitted at the predefined power.

In a fifth aspect, alone or in combination with one or more of the first through fourth aspects, the SRS configuration indicates a repetition at which the first UE is to transmit the SRS, wherein the repetition corresponds to an intra-slot repetition or an inter-slot repetition.

In a sixth aspect, alone or in combination with one or more of the first through fifth aspects, each repetition of the SRS is to be transmitted by the first UE in accordance with a preconfigured list of transmit powers.

In a seventh aspect, alone or in combination with one or more of the first through sixth aspects, each repetition of the SRS is to be transmitted by the first UE in accordance with a different transmission configuration indicator (TCI) state as compared to another repetition of the SRS.

In an eighth aspect, alone or in combination with one or more of the first through seventh aspects, process 1000 includes transmitting the power headroom report to the base station based at least in part on an occurrence of a triggering event, wherein the triggering event occurs when the SRS is transmitted from the first UE.

In a ninth aspect, alone or in combination with one or more of the first through eighth aspects, process 1000 includes transmitting, to the base station, a capability message indicating that the first UE supports the SRS configuration from the base station via one or more of an RRC configuration, a special SRS TPC command, or group common downlink control information.

In a tenth aspect, alone or in combination with one or more of the first through ninth aspects, process 1000 includes transmitting, to the base station, a capability message indicating that the first UE supports power headroom reporting based at least in part on the SRS transmitted from the first UE.

In an eleventh aspect, alone or in combination with one or more of the first through tenth aspects, process 1000 includes transmitting, to the base station, a capability message indicating that the first UE supports transmitting the SRS in accordance with a repetition, wherein each repetition of the SRS is configured to be associated with one or more of a different transmit power or a different transmission configuration indicator (TCI) state.

In a twelfth aspect, alone or in combination with one or more of the first through eleventh aspects, the first UE is an aggressor UE and the second UE is a victim UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
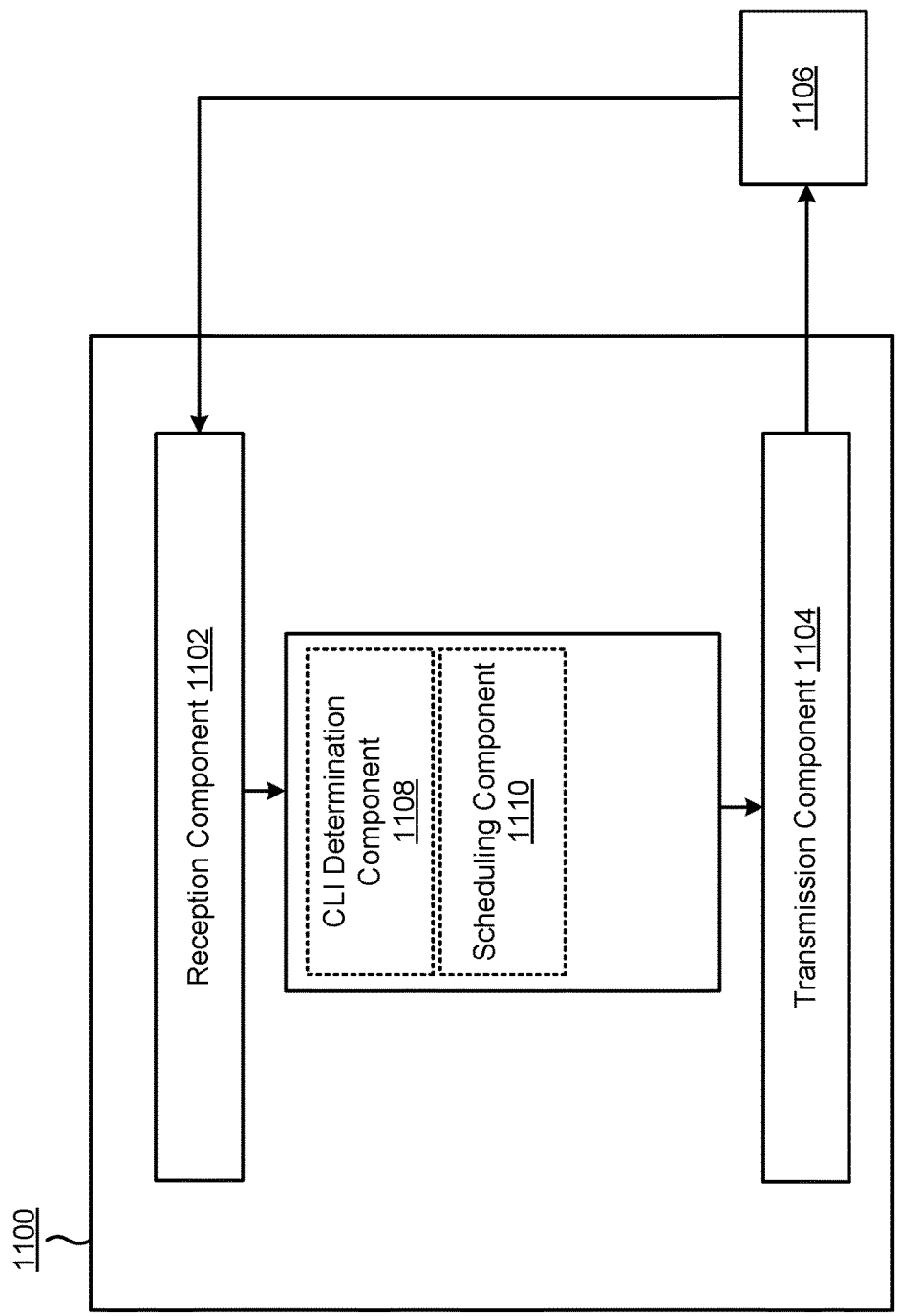
FIGS. 11-12 are block diagrams of example apparatuses for wireless communication, in accordance with various aspects of the present disclosure.

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a CLI determination component 1108, or a scheduling component 1110, among other examples.

In some aspects, the apparatus 1100 may be configured to perform one or more operations described herein in connection with FIG. 8. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be collocated with the reception component 1102 in a transceiver.

The reception component 1102 may receive an SRS from a first UE. The reception component 1102 may receive a CLI report from a second UE based at least in part on the SRS. The determination component 1108 may determine a CLI from an uplink shared channel based at least in part on a power headroom report for the uplink shared channel received from the first UE and the CLI report received from the second UE. In some aspects, the determination component 1108 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The scheduling component 1110 may schedule an upcoming slot for one or more of the first UE or the second UE based at least in part on the CLI determined from the uplink shared channel. In some aspects, the scheduling component 1110 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The determination component 1108 may estimate an actual interference from the uplink shared channel based at least in part on the power headroom report and the CLI report; and adjust a CLI value indicated in the CLI report based at least in part on the actual interference from the uplink shared channel and a power associated with the uplink shared channel.

The transmission component 1104 may transmit, to the first UE, an SRS configuration that enables the first UE to transmit the SRS at a predefined power.

The reception component 1102 may receive the power headroom report from the first UE based at least in part on an occurrence of a triggering event, wherein the triggering event occurs when the SRS is transmitted by the first UE.

The reception component 1102 may receive, from the second UE, a capability message indicating that the second UE is capable of performing a CLI measurement using a CSI-IM resource, wherein the CLI report received from the second UE is based at least in part on the CLI measurement performed using the CSI-IM resource.

The reception component 1102 may receive, from the first UE, a capability message indicating that the first UE supports an SRS configuration from the base station via one or more of: an RRC configuration, a special SRS TPC command, or group common downlink control information.

The reception component 1102 may receive, from the first UE, a capability message indicating that the first UE supports power headroom reporting based at least in part on the SRS transmitted from the first UE.

The reception component 1102 may receive, from the first UE, a capability message indicating that the first UE supports transmitting the SRS in accordance with a repetition, wherein each repetition of the SRS is configured to be associated with one or more of a different transmit power or a different transmission configuration indicator (TCI) state.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
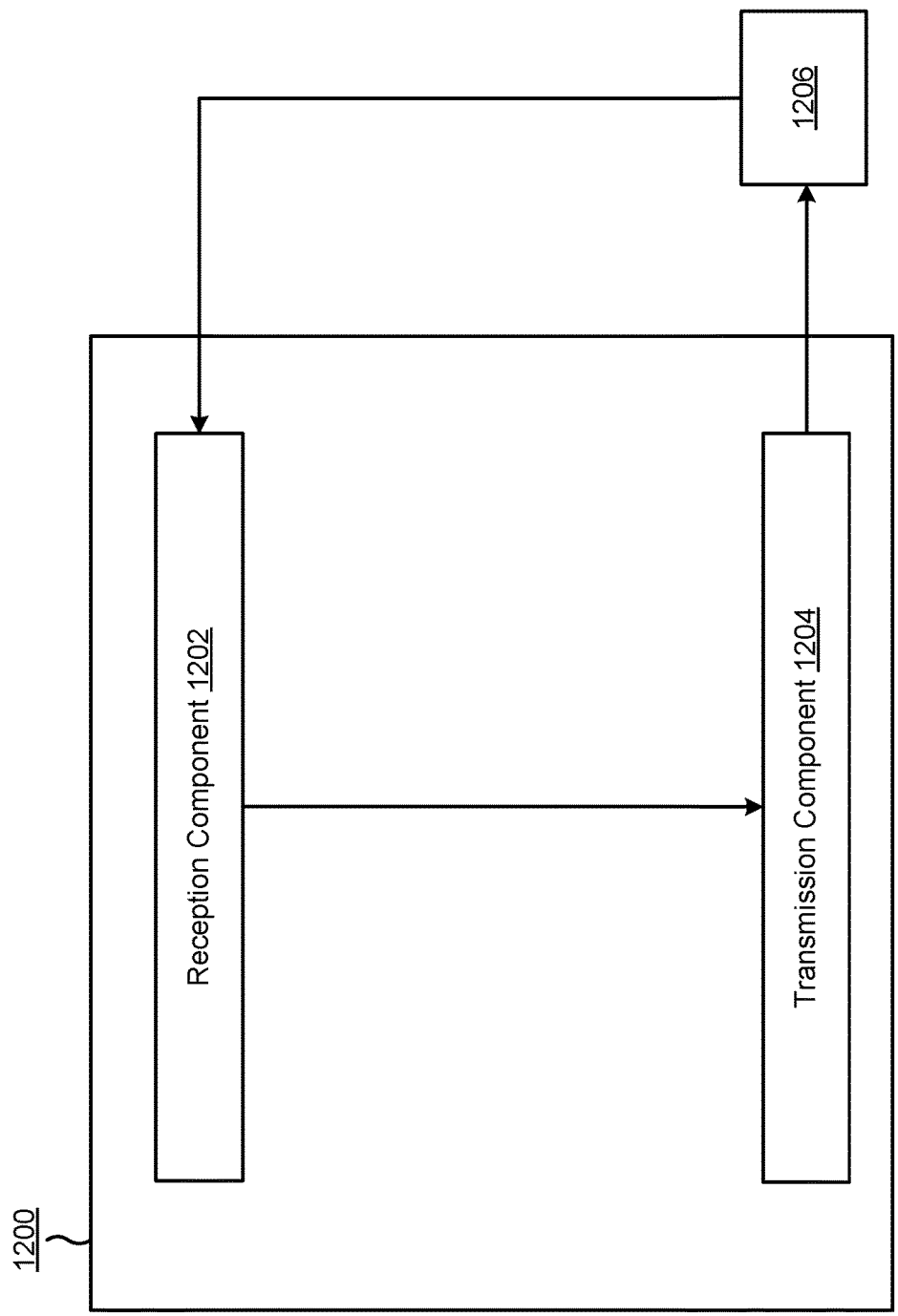

FIG. 12 is a block diagram of an example apparatus 1200 for wireless communication. The apparatus 1200 may be a first UE, or a first UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIG. 8. Additionally or alternatively, the apparatus 1200 may be configured to perform one or more processes described herein, such as process 1000 of FIG. 10. In some aspects, the apparatus 1200 and/or one or more components shown in FIG. 12 may include one or more components of the first UE described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the first UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first UE described above in connection with FIG. 2. In some aspects, the transmission component 1204 may be collocated with the reception component 1202 in a transceiver.

The reception component 1202 may receive an SRS configuration from a base station. The transmission component 1204 may transmit an SRS at a predefined power based at least in part on the SRS configuration. The transmission component 1204 may transmit, to the base station, a power headroom report for an uplink shared channel, wherein a CLI from the uplink shared channel is to be determined by the base station based at least in part on the power headroom report and a CLI report from a second UE based at least in part on the SRS transmitted by the first UE.

The transmission component 1204 may transmit the power headroom report to the base station based at least in part on an occurrence of a triggering event, wherein the triggering event occurs when the SRS is transmitted from the first UE.

The transmission component 1204 may transmit, to the base station, a capability message indicating that the first UE supports the SRS configuration from the base station via one or more of: an RRC configuration, a special SRS TPC command, or group common downlink control information.

The transmission component 1204 may transmit, to the base station, a capability message indicating that the first UE supports power headroom reporting based at least in part on the SRS transmitted from the first UE.

The transmission component 1204 may transmit, to the base station, a capability message indicating that the first UE supports transmitting the SRS in accordance with a repetition, wherein each repetition of the SRS is configured to be associated with one or more of a different transmit power or a different transmission configuration indicator (TCI) state.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
   receiving a sounding reference signal (SRS) from a first user equipment (UE);
   receiving a cross-link interference (CLI) report from a second UE based at least in part on the SRS; and
   determining a CLI from an uplink shared channel based at least in part on a power headroom report for the uplink shared channel received from the first UE and the CLI report received from the second UE.

2. A method of wireless communication performed by a first user equipment (UE), comprising:
   receiving a sounding reference signal (SRS) configuration from a base station;
   transmitting an SRS at a predefined power based at least in part on the SRS configuration; and
   transmitting, to the base station, a power headroom report for an uplink shared channel, wherein a cross-link interference (CLI) from the uplink shared channel is to be determined by the base station based at least in part on the power headroom report and a CLI report from a second UE based at least in part on the SRS transmitted by the first UE.

3. A base station for wireless communication, comprising:
   a memory; and
   one or more processors operatively coupled to the memory, the memory and the one or more processors configured to:
      receive a sounding reference signal (SRS) from a first user equipment (UE);
      receive a cross-link interference (CLI) report from a second UE based at least in part on the SRS; and
      determine a CLI from an uplink shared channel based at least in part on a power headroom report for the uplink shared channel received from the first UE and the CLI report received from the second UE.

4. The base station of claim 3, wherein the one or more processors are further configured to:
   schedule an upcoming slot for one or more of the first UE or the second UE based at least in part on the CLI determined from the uplink shared channel.

5. The base station of claim 3, wherein the one or more processors, when
   determining the CLI, are configured to:
      estimate an actual interference from the uplink shared channel based at least in part on the power headroom report and the CLI report; and
      adjust a CLI value indicated in the CLI report based at least in part on the actual interference from the uplink shared channel and a power associated with the uplink shared channel.

6. The base station of claim 3, wherein the one or more processors are further configured to:
   transmit, to the first UE, an SRS configuration that enables the first UE to transmit the SRS at a predefined power.

7. The base station of claim 6, wherein the predefined power is a maximum power allowed at the UE.

8. The base station of claim 6, wherein the SRS configuration is a radio resource control (RRC) configuration that semi-statically configures the first UE with SRS resources dedicated for CLI measurement, wherein the RRC configuration includes a field that indicates that the SRS is to be transmitted at the predefined power.

9. The base station of claim 6, wherein the SRS configuration is transmitted via a special SRS transmit power control (TPC) command that configures the first UE to transmit the SRS at the predefined power.

10. The base station of claim 6, wherein the SRS configuration is transmitted via a group common downlink control information (DCI) that triggers the SRS to be transmitted at the predefined power.

11. The base station of claim 6, wherein the SRS configuration indicates a repetition at which the first UE is to transmit the SRS, wherein the repetition corresponds to an intra-slot repetition or an inter-slot repetition.

12. The base station of claim 11, wherein each repetition of the SRS is to be transmitted by the first UE in accordance with a preconfigured list of transmit powers.

13. The base station of claim 11, wherein each repetition of the SRS is to be transmitted by the first UE in accordance with a different transmission configuration indicator (TCI) state as compared to another repetition of the SRS.

14. The base station of claim 3, wherein the one or more processors are further configured to:
   receive the power headroom report from the first UE based at least in part on an occurrence of a triggering event, wherein the triggering event occurs when the SRS is transmitted by the first UE.

15. The base station of claim 3, wherein the one or more processors are further configured to:
   receive, from the second UE, a capability message indicating that the second UE is capable of performing a CLI measurement using a channel state information interference management (CSI-IM) resource, wherein the CLI report received from the second UE is based at least in part on the CLI measurement performed using the CSI-IM resource.

16. The base station of claim 3, wherein the one or more processors are further configured to:
receive, from the first UE, a capability message indicating that the first UE supports an SRS configuration from the base station via one or more of: a radio resource control (RRC) configuration, a special SRS transmit power control (TPC) command, or group common downlink control information.

17. The base station of claim 3, wherein the one or more processors are further configured to:
receive, from the first UE, a capability message indicating that the first UE supports power headroom reporting based at least in part on the SRS transmitted from the first UE.

18. The base station of claim 3, wherein the one or more processors are further configured to:
receive, from the first UE, a capability message indicating that the first UE supports transmitting the SRS in accordance with a repetition, wherein each repetition of the SRS is configured to be associated with one or more of a different transmit power or a different transmission configuration indicator (TCI) state.

19. A first user equipment (UE) for wireless communication, comprising:
a memory; and
one or more processors operatively coupled to the memory, the memory and the one or more processors configured to:
receive a sounding reference signal (SRS) configuration from a base station;
transmit an SRS at a predefined power based at least in part on the SRS configuration; and
transmit, to the base station, a power headroom report for an uplink shared channel, wherein a cross-link interference (CLI) from the uplink shared channel is to be determined by the base station based at least in part on the power headroom report and a CLI report from a second UE based at least in part on the SRS transmitted by the first UE.

20. The first UE of claim 19, wherein the predefined power is a maximum power allowed at the UE.

21. The first UE of claim 19, wherein the SRS configuration is a radio resource control (RRC) configuration that semi-statically configures the first UE with SRS resources dedicated for CLI measurement, wherein the RRC configuration includes a field that indicates the SRS is to be transmitted at the predefined power.

22. The first UE of claim 19, wherein the SRS configuration is received via a special SRS transmit power control (TPC) command that configures the first UE to transmit the SRS at the predefined power.

23. The first UE of claim 19, wherein the SRS configuration is received via a group common downlink control information (DCI) that triggers the SRS to be transmitted at the predefined power.

24. The first UE of claim 19, wherein the SRS configuration indicates a repetition at which the first UE is to transmit the SRS, wherein the repetition corresponds to an intra-slot repetition or an inter-slot repetition.

25. The first UE of claim 24, wherein each repetition of the SRS is to be transmitted by the first UE in accordance with a preconfigured list of transmit powers.

26. The first UE of claim 24, wherein each repetition of the SRS is to be transmitted by the first UE in accordance with a different transmission configuration indicator (TCI) state as compared to another repetition of the SRS.

27. The first UE of claim 19, wherein the one or more processors are further configured to:
transmit the power headroom report to the base station based at least in part on an occurrence of a triggering event, wherein the triggering event occurs when the SRS is transmitted from the first UE.

28. The first UE of claim 19, wherein the one or more processors are further configured to:
transmit, to the base station, a capability message indicating that the first UE supports the SRS configuration from the base station via one or more of: a radio resource control (RRC) configuration, a special SRS transmit power control (TPC) command, or group common downlink control information.

29. The first UE of claim 19, wherein the one or more processors are further configured to:
transmit, to the base station, a capability message indicating that the first UE supports power headroom reporting based at least in part on the SRS transmitted from the first UE.

30. The first UE of claim 19, wherein the one or more processors are further configured to:
transmit, to the base station, a capability message indicating that the first UE supports transmitting the SRS in accordance with a repetition, wherein each repetition of the SRS is configured to be associated with one or more of a different transmit power or a different transmission configuration indicator (TCI) state.

* * * * *